June 24, 1930.  C. S. PINKERTON  1,767,613
METHOD OF AND APPARATUS FOR MEASURING THE FLOW OF FLUIDS
Filed Aug. 28, 1925
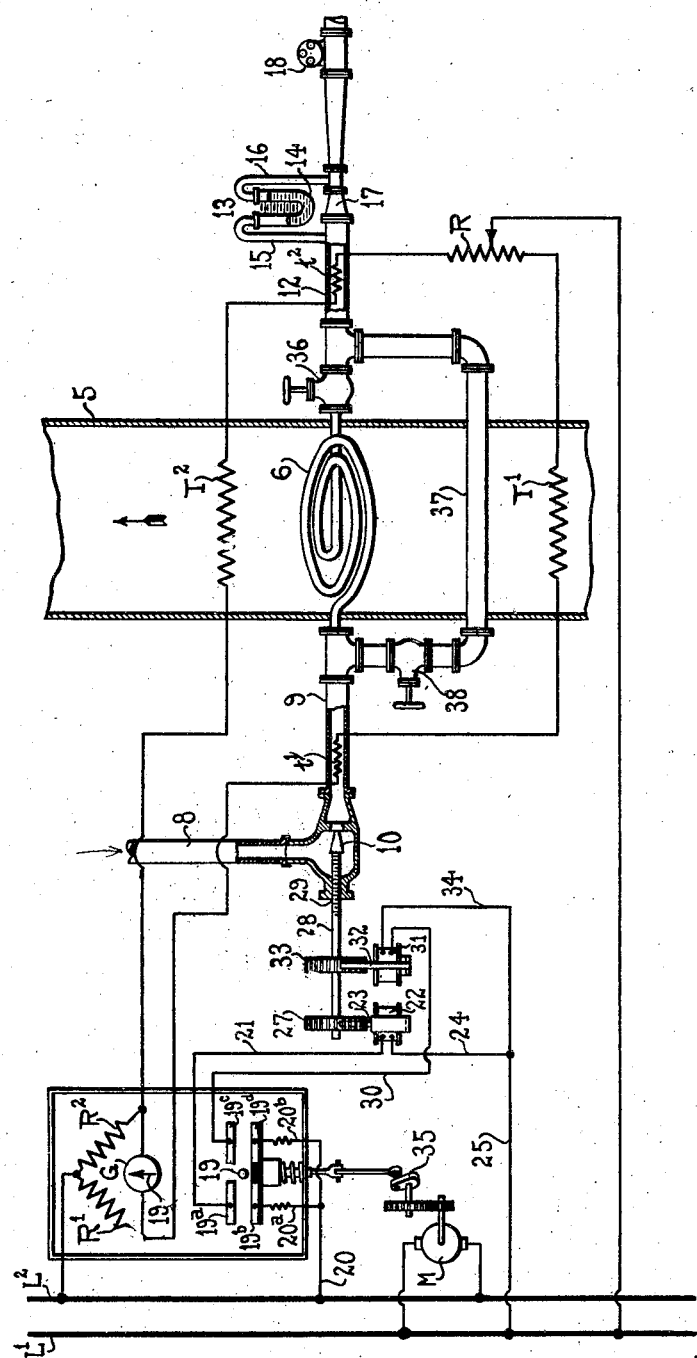
INVENTOR
Clarence S. Pinkerton
BY
Frank H. Hubbard
ATTORNEY Patented June 24, 1930

1,767,613

UNITED STATES PATENT OFFICE

CLARENCE S. PINKERTON, OF MILWAUKEE, WISCONSIN, ASSIGNOR, BY MESNE ASSIGNMENTS, TO CUTLER-HAMMER, INC., A CORPORATION OF DELAWARE

METHOD OF AND APPARATUS FOR MEASURING THE FLOW OF FLUIDS

Application filed August 28, 1925. Serial No. 53,040.

This invention relates to improvements in methods of and apparatus for measuring the flow of fluids. More particularly the invention relates to meters of the type disclosed in the patent of J. C. Wilson, No. 1,614,702, dated January 18, 1927.

Meters of the type disclosed in the aforementioned patent comprise in general means for circulating a liquid or fluid medium in heat exchanging relation with the fluid to be measured, means for utilizing the temperature change of this medium in determining the rate of flow, means for utilizing the quantity of such medium in determining the rate of flow, and means for utilizing the temperature change of the fluid to be measured in determining the rate of flow.

An object of the invention is to simplify meters of the aforementioned character.

Another object is to obviate the necessity for measuring or maintaining constant certain of the factors involved in the heat exchange.

Another object is to provide for maintaining a constant ratio between certain of said factors.

Another and more specific object is to provide for maintaining a constant ratio between the temperature change of the fluid medium and the temperature change of the fluid to be measured.

Another object is to provide for maintaining the aforementioned ratio whereby the rate of flow of the fluid medium may be utilized as a direct indication of the rate of flow of the fluid being measured.

Other objects and advantages of the invention will hereinafter appear.

The accompanying drawing illustrates schematically and diagrammatically one embodiment of the invention and the same will now be described, it being understood that the embodiment illustrated is susceptible of various modifications without departing from the scope of the appended claims.

In the drawing the numeral 5 designates a conduit through which blast furnace air or other fluid to be measured is adapted to flow in the direction indicated by the arrow. Located within the conduit 5 is a coiled tube 6 or other suitable means for circulating a fluid medium in heat exchanging relation with said first mentioned fluid. Blast furnace air, due to its pressure of twelve to fifteen pounds, is always superheated to a temperature of about 150 to 225 degrees F., and hence it is possible to measure this air by a cooling method without encountering any difficulties due to condensation of moisture on the cooling device. The tube 6 is therefore preferably supplied from a suitable source of cooling water through pipes 8 and 9, a needle valve 10 being provided for varying the rate of flow of water through said tube, as hereinafter described. The water is adapted to discharge from tube 6 through a pipe 12, said pipe having associated therewith a differential fluid meter 13 comprising a U-tube 14 containing a body of liquid and having the respective legs communicating, as indicated at 15 and 16, with opposite ends of a Venturi tube 17 or the like. Also associated with pipe 12 is an integrating fluid meter 18.

Located within the conduit 5 at opposite sides of the coil 6 are thermometer resistances $T^1$ and $T^2$, respectively, whereas thermometer resistances $t^1$ and $t^2$ are likewise located within the pipes 9 and 12, respectively, at opposite ends of the coil 6. The inlet thermometer resistances $T^1$ and $t^1$ are connected in series to form one leg of a Wheatstone bridge, whereas the outlet thermometer resistances $T^2$ and $t^2$ are similarly connected in series to form another leg of the bridge. The Wheatstone bridge is provided with fixed resistances $R^1$ and $R^2$ forming two legs thereof, in the usual manner, whereas a variable resistance R is provided between the pairs of resistances $t^1$, $T^1$ and $T^2$, $t^2$ to provide for initially balancing the bridge, as hereinafter described. The Wheatstone bridge circuit is connected in the usual manner with a suitable source of electrical energy, as indicated by lines $L^1$, $L^2$. Connected across the Wheatstone bridge is a control galvanometer G of usual construction, said galvanometer having a movable conducting element 19. The element 19 is shown in the position it normally assumes when the Wheatstone bridge is in balanced condition, whereas upon unbalancing of the bridge in one direction said element is moved into a position to be clamped between the stationary contact 19ª and the intermittently movable contact 19ᵇ, thus providing an energizing circuit for the winding 22 of a solenoid operated pawl 23; which circuit may be traced from line L², by conductors 20 and 20ª, through contact 19ᵇ, element 19 and contact 19ª, by conductor 21 through winding 22, and by conductors 24 and 25 to line L¹. Operation of pawl 23 effects movement of a ratchet wheel 27 which is secured to the stem 28 of needle valve 10, thus effecting opening movement of the latter by cooperation of the threaded portion 29 of its stem with a threaded opening in the valve chamber. The resulting increased flow of water through coil 6 is adapted to effect re-balancing of the Wheatstone bridge. When unbalancing of the bridge is of an opposite value, element 19 is adapted to move into a position to be clamped between the stationary contact 19ᶜ and the intermittently movable contact 19ᵈ, to complete an energizing circuit for winding 31 of a solenoid operated pawl 32 to effect movement of valve stem 28 in the opposite direction through ratchet wheel 33, thus effecting closing movement of valve 10. The energizing circuit for winding 31 may be traced from line L², by conductors 20 and 20ᵇ, through contact 19ᵈ, element 19 and contact 19ᶜ, by conductor 30 through said winding, and by conductors 34 and 25 to line L¹. Any suitable means may be provided for effecting such intermittent movement of contacts 19ᵇ and 19ᵈ, whereas I have shown for this purpose a motor M connected across lines L¹, L², and adapted to effect operation of said contacts through suitable reduction gearing and an eccentric 35.

I preferably provide means for by-passing the coil 6 to facilitate initial balancing of the Wheatstone bridge, said means comprising a valve 36 which is adapted to be closed for preventing passage of the water through coil 6, and a by-pass pipe 37 having a valve 38 which is adapted when open to permit passage of the water from pipe 9 through pipe 37 to pipe 12. It will of course be understood that by-pass pipe 37 is located outside of conduit 5.

With the coil 6 by-passed as aforedescribed, the thermometer resistances T¹ and T² will each attain the normal temperature of the blast furnace air, whereas the thermometer resistances $t^1$ and $t^2$ will each attain the normal temperature of the water, and the Wheatstone bridge may obviously be balanced by manipulation of the rheostat R. Thereafter the valve 36 is opened and the valve 38 closed, thus effecting passage of the cooling water through coil 6 in heat exchanging relation with the air passing through conduit 5. Assuming a constant basic temperature of the air flowing in conduit 5, if too little water is flowing through coil 6 the combined values of the thermal effects on resistances $t^2$ and $T^2$ will be higher than the combined values of the thermal effects on resistances $t^1$ and $T^1$, thereby unbalancing the bridge circuit and causing movement of galvanometer element 19 into a position to bridge contacts 19ª and 19ᵇ, as aforedescribed, to effect opening movement of the needle valve 10; which opening movement will continue until sufficient water is flowing to bring the thermometer resistances $t^2$ and $T^2$ down to a temperature such that the combined values thereof are equal to the combined values of the thermometer resistances $t^1$ and $T^1$. The bridge circuit will thus be again balanced, thereby indicating attainment of a predetermined relation or ratio between the temperature rise of the water and the temperature drop of the air, due to the heat exchange, and the device will automatically maintain this ratio. The ratio aforementioned will of course depend upon the physical characteristics (such as specific heat or heat capacity) of the fluids between which the heat exchange takes place. Thus, the meter could be operated with an air temperature drop of, say, 10 degrees F., which would tend to minimize the effect of balance shifts encountered when a lesser temperature drop is employed, whereas the water could be run at a temperature rise of about 50 degrees F.

The equation of the heat relation would be:

cu. ft. × ht. cap. × t. d. = q. × t. r. × sp. ht.

or $$\text{cu. ft.} = \frac{q. \times (t.r.) \times sp.ht.}{(t.d.) \times ht.cap.}$$

where cu. ft. = standard cubic feet of air per hour.

ht. cap. = heat capacity per cubic foot of air.

sp. ht. = specific heat per pound of water.

q. = pounds of water per hour.

t. r. = temperature rise of water.

t. d. = temperature drop of air.

The values of "specific heat" and "heat capacity" being essentially constant, the operation of the meter is such as to maintain the ratio $$\left(\frac{t.r.}{t.d.}\right)$$

a constant, so that the quantity of water flowing is a direct measure of the quantity of air in standard cubic feet, and the meters 13 and 18 may be suitably calibrated to indicate the rate and quantity of air flow in standard cubic feet, thus obviating the necessity for any mathematical calculations.

Moreover, if the basic air temperature increases there will be a greater gradient between the air and water temperatures and a greater absorption of heat by the water, with a proportional increase in the temperature rise of the water and the temperature drop of the air. Such increase in basic temperature of the air will not cause unbalancing of the bridge circuit, inasmuch as the percentage change affects both factors so that the ratio will remain the same, say at 12.5 degrees F. temperature drop of the air and 62.5 degrees F. temperature rise of the water.

As will be apparent to those skilled in the art, the necessity for meters 13 and 18 may be eliminated and the rate of flow of air in conduit 5 measured by providing a constant flow of water, and utilizing the galvanometer element 19 for balancing the bridge through a slide-wire rheostat,—in which case the device would measure the variable ratio between the temperature rise of the water and the temperature drop of the air; whereas the rate of flow of air could be indicated and recorded directly by said element upon a suitably calibrated moving chart or the like.

While I have particularly described the illustrated device as adapted for the measurement of the rate of flow of heated air by effecting a heat exchange between the same and a flow of cooling water, it is to be understood that any desired fluids may be utilized in the respective flows, provided there is a substantial difference in the temperatures thereof prior to the heat exchange.

What I claim and desire to secure by Letters Patent is:

1. In a method of ascertaining the rate of flow of a fluid, the steps which comprise causing a heat transfer between the flowing fluid and a fluid medium so that there are three factors involved, the temperature change of said fluid, the temperature change of the fluid medium and the quantity of fluid medium, maintaining only a predetermined ratio between the values of such temperature changes irrespective of relatively wide variations in such values per se, and measuring the quantity of said fluid medium.

2. The method of measuring a flow of fluid, which comprises effecting a heat transfer between the flowing fluid and a flowing medium, utilizing the effect of relative changes in temperatures of said fluid and said medium as a result of the heat transfer to so proportion the relative rates of flow of said fluid and said medium as to maintain only a predetermined proportionality between the temperature changes thereof due to the heat transfer under conditions of relatively wide variations in the values of such temperature changes per se measuring the flow of said medium, and utilizing the value so ascertained as a direct measure of the flow of said fluid.

3. Apparatus for measuring the rate of flow of a fluid, comprising a conduit through which the fluid to be measured flows, means for effecting a flow of fluid medium in heat exchanging relation with the fluid in said conduit, means for automatically determining the relative changes in temperatures of said fluid and said fluid medium as a result of the heat transfer, said last mentioned means including means for automatically varying the rate of flow of said fluid medium for providing only a constant ratio of the temperature changes of said fluid and said fluid medium due to the heat transfer irrespective of relatively wide variations in the values of such temperature changes per se, and means controlled by the rate of flow of said fluid medium for directly indicating the rate of flow of said fluid.

4. The combination with a plurality of conduits for effecting passage of separate fluids in heat exchanging relation with each other, of thermometer resistances of equal value at the inlet and exit ends respectively of one of said conduits, thermometer resistances of equal value at the inlet and exit ends respectively of another of said conduits, means for connecting said inlet thermometer resistances to form one arm of a Wheatstone bridge, means for connecting said exit thermometer resistances to form another arm of said bridge, a balancing resistance interposed between said first-mentioned inlet thermometer resistance and said second-mentioned exit thermometer resistance, and means controlled by said bridge for maintaining the latter in substantially balanced condition, said means including means for varying the rate of flow of one of said fluids to thereby maintain a predetermined proportionality between the temperature differences of the respective fluids as a result of the heat transfer.

5. The combination with a plurality of conduits for effecting passage of separate fluids in heat exchanging relation with each other, of thermometer resistances of equal value at the inlet and exit ends respectively of one of said conduits, thermometer resistances of equal value at the inlet and exit ends respectively of another of said conduits, means for connecting said inlet thermometer resistances to form one arm of a Wheatstone bridge, means for connecting said exit thermometer resistances to form another arm of said bridge, a balancing resistance interposed between said inlet thermometer resistances and said exit thermometer resistances, means controlled by said bridge for automatically varying the rate of flow of one of said fluids whereby said bridge is maintained in substantially balanced condition, and means for utilizing the rate of flow of said last mentioned fluid as a direct indication of the rate of flow of the other of said fluids.

6. The combination with a pair of conduits for effecting passage of separate fluids in heat exchanging relation with each other, of thermometer resistances of equal value at the inlet and exit ends respectively of one of said conduits, thermometer resistances of equal value at the inlet and exit ends respectively of another of said conduits, means for connecting said inlet thermometer resistances to form one arm of a Wheatstone bridge, means for connecting said exit thermometer resistances to form another arm of said bridge, means for initially balancing said bridge, means controlled by said bridge for automatically maintaining the latter in substantially balanced condition, said means including means for varying the rate of flow of one of said fluids to thereby maintain a predetermined proportionality between the temperature differences of the respective fluids as a result of the heat exchange, and means for directly measuring the flow of said one of said fluids.

7. The combination with a pair of conduits for effecting passage of separate fluids in heat exchanging relation with each other, of thermometer resistances of equal value at the inlet and exit ends respectively of one of said conduits, thermometer resistances of equal value at the inlet and exit ends respectively of the other of said conduits, means for connecting said inlet thermometer resistances to form one arm of a Wheatstone bridge, means for connecting said exit thermometer resistances to form another arm of said bridge, means for initially balancing said Wheatstone bridge, means controlled by said bridge for maintaining the latter in substantially balanced condition, said means including means for varying the rate of flow of one of said fluids to thereby maintain a predetermined proportionality between the temperature differences of the respective fluids as a result of the heat exchange, and means for measuring the flow of said one of said fluids, said means being calibrated to indicate directly the flow of the other of said fluids.

8. A fluid meter comprising a conduit through which a stream of the fluid to be measured flows, means for effecting a heat exchange between said fluid and a flowing medium, and associated means respectively subjected to the temperatures of said fluid and said medium before and after said heat exchange, said means including means to automatically vary the rate of flow of said medium to maintain only a constant proportionality between the temperature change of said fluid and the temperature change of said medium resulting from the heat transfer and irrespective of relatively wide variations in the values of such temperature changes per se.

9. A fluid meter comprising a conduit through which a stream of the fluid to be measured flows, a second conduit providing for passage of a medium in heat exchanging relation with said fluid, individual thermometer resistances in the respective conduits to be subjected to the thermal effects of said fluid and said medium prior to the heat exchange, like thermometer resistances in the respective conduits to be subjected to the thermal effects of said fluid and said medium after the heat exchange, means for connecting said first mentioned resistances in series as one leg of a Wheatstone bridge, means for connecting said second mentioned resistances in series as another leg of said bridge, a pair of equal resistances forming the other legs of said bridge, and means for automatically effecting and maintaining a substantially balanced condition of said bridge, said means comprising an electromagnetically operated valve for controlling the flow of said medium and a galvanometer device connected across said bridge and adapted to control the operation of said valve.

In witness whereof, I have hereunto subscribed my name.

CLARENCE S. PINKERTON.